Figure 1:
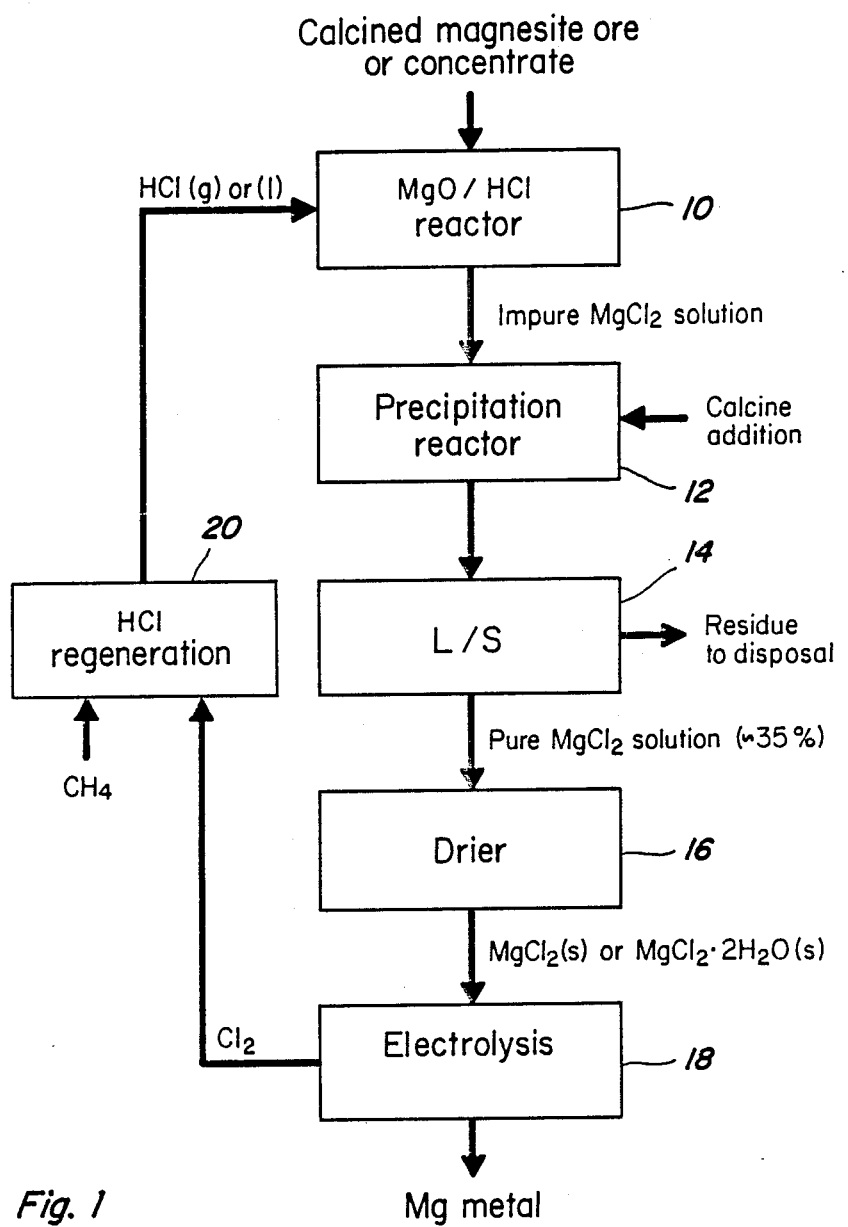

United States Patent [19]

Harris et al.

[11] Patent Number: 4,743,347
[45] Date of Patent: May 10, 1988

[54] PRODUCTION OF PURE MGCL₂ SOLUTION SUITABLE FOR THE PRODUCTION OF MAGNESIUM METAL FROM AN IMPURE MAGNESITE ORE OR CONCENTRATE

[75] Inventors: G. Bryn Harris, Kirkland; John G. Peacey, Lancaster; Serge Monette, Longueuil, all of Canada

[73] Assignee: Pamour Inc., Timmins, Canada

[21] Appl. No.: 48,643

[22] Filed: May 11, 1987

[30] Foreign Application Priority Data

May 29, 1986 [CA] Canada .................................. 510355

[51] Int. Cl.⁴ .............................................. C25B 1/00
[52] U.S. Cl. ....................................... 204/60; 204/70; 423/158; 423/155; 423/163; 423/481; 423/486
[58] Field of Search .................. 204/70, 59 M, 60, 61; 423/158, 163, 155, 481, 486

[56] References Cited

U.S. PATENT DOCUMENTS 2,398,493 4/1946 Butt et al. ............................ 204/70
2,398,891 4/1946 Julien ..................................... 204/70

Primary Examiner—R. L. Andrews
Attorney, Agent, or Firm—Fleit, Jacobson, Cohn & Price

[57] ABSTRACT

A process for producing a substantially pure, concentrated MgCl₂ solution suitable for subsequent molten salt electrolysis to magnesium metal from an impure magnesite ore or concentrate is disclosed. The process comprises the steps of calcining a magnesite ore or concentrate at a temperature greater than 600° C. to decompose most of the magnesite and form a reactive magnesia, dissolving such reactive magnesia with either concentrated hydrochloric acid or hydrogen chloride gas with the addition of a surface active wetting agent to produce an impure concentrated MgCl₂ solution, and reacting such impure concentrated MgCl₂ solution with a minimum of excess magnesia to increase the pH of the solution to at least 5.5 to precipitate undesirable impurities from solution and produce a substantially pure MgCl₂ solution.

6 Claims, 1 Drawing Sheet

PRODUCTION OF PURE MGCL2 SOLUTION SUITABLE FOR THE PRODUCTION OF MAGNESIUM METAL FROM AN IMPURE MAGNESITE ORE OR CONCENTRATE

This invention relates to a process for producing a subtantially pure concentrated $MgCl_2$ solution suitable for the production of magnesium metal from an impure magnesite ore or concentrate.

The majority of the magnesium metal sold in the world is produced by electrolysis of anhydrous $MgCl_2$ (Norsk Hydro and I. G. Farben processes), or by electrolysis of hydrated $MgCl_2.2H_2O$ (Dow process). The magnesium containing feedstocks for the current electrolytic processes are either: $Mg(OH)_2$ or calcined MgO produced from seawater or $MgCl_2$-containing natural or lake brines. Using both these Mg-containing feedstocks, certain purification steps have to be carried out to ensure that deleterious impurities, in particular B, Br, P, Ni and other heavy metals, are removed to very low levels. Some magnesium metal is also produced by thermal reduction of calcined dolomite by ferro-silicon (Magnatherm and Pidgeon processes). An excellent review of magnesium metal production is given by N. Jarrett in Metallurgical Treatises published by AIME.

Based on available information, it is believed that a process for producing a pure $MgCl_2$ solution, suitable for the production of magnesium metal by molten salt electrolysis, directly from magnesite ore or concentrate has not been developed previously. A recent patent (Canadian Pat. No. 1,128,288) describes the preparation of anhydrous molten magnesium chloride from lump magnesite by reaction with chlorine and carbon monoxide. However, this process has not yet been commercialized.

Applicant has surprisingly found that a substantially pure $MgCl_2$ solution can be produced directly from magnesite ore or concentrate for the purpose of magnesium metal production by any of the established electrolytic processes.

The process, in accordance with the present invention, comprises the steps of calcining a magnesite ore or concentrate at a temperature greater than 600° C., preferably 700°–900° C., to decompose most of the magnesite and form a reactive magnesia, dissolving the reactive magnesia with either concentrated hydrochloric acid or hydrogen chloride gas with the addition of a surface active wetting agent (surfactant) to produce an impure concentrated $MgCl_2$ solution, and reacting such impure concentrated $MgCl_2$ solution with a minimum of excess magnesia to increase the measured pH of the solution to at least 5.5, but preferably 6.5–6.8 to precipitate undesirable impurities from solution and produce a substantially pure $MgCl_2$ solution.

The impurities precipitated from solution by the addition of excess magnesia as the precipitating agent are generally the heavy and base metals such as iron, nickel, chromium and manganese.

The addition of surfactant is made to increase the wettability, and hence the reactivity, of the magnesia calcine, due to the presence of hydrophobic silicate minerals of magnesium such as talc and serpentine.

The substantially pure concentrated $MgCl_2$ solution may be subsequently dried to anhydrous $MgCl_2$ or hydrated $MgCl_2.2H_2O$ for magnesium metal production by any of the established electrolytic processes.

The $Cl_2$ produced during electrolysis to magnesium metal may be reacted with $CH_4$ to regenerate hydrochloric acid or hydrogen chloride gas.

The invention will now be disclosed by way of example with reference to the accompanying drawing illustrating a preferred flowsheet.

Referring to FIG. 1, magnesite ore or concentrate is calcined at a temperature of greater than 600° C. in a suitable calcination device to decompose most of the magnesite ($MgCO_3$) and form a reactive magnesia (MgO). The optimum calcination temperature is dependent on the type of magnesite used. Any known calcination device, such as a rotary kiln or a flash calciner can be used depending on the size distribution of the input material.

The calcined material (MgO) is fed to a suitable contacting device 10 in which it is reacted with concentrated hydrochloric acid or hydrogen chloride gas in the presence of a surface-wetting agent to produce an impure concentrated $MgCl_2$ solution. The contacting device may be an agitated tank or a MgO slurry-gas scrubber. The impure $MgCl_2$ solution is then allowed to react with excess magnesium oxide calcine in the same or a second stage reactor 12 to increase the pH to at least 5.5, but preferably 6.5–6.8 to precipitate out undesirable heavy metal impurities, such as iron, nickel, chromium and manganese from solution. The contents of the reactor are filtered in a suitable liquid/solid separation device 14 to produce a substantially pure $MgCl_2$ solution for subsequent processing while the residue is sent to disposal.

The resulting pure concentrated $MgCl_2$ solution (at least 30% $MgCl_2$) is then fed to a suitable drier 16 to produce a hydrated $MgCl_2.2H_2O$ for use as a feed to the Dow Mg electrolysis process. A suitable drier would be a fluid-bed drier. The pure concentrated $MgCl_2$ solution may also be dried to anhydrous $MgCl_2$ for use as a feed to the Norsk Hydro electrolysis process to form Mg metal. The possible integration of this process with the Dow or Norsk Hydro electrolysis flowsheets is shown by block 18 in the drawing.

Chlorine gas produced during electrolysis can be regenerated to liquid or gaseous hydrogen chloride in a suitable HCl regeneration device 20 using $CH_4$.

The above process is very much simpler than the existing processes, which require one or more purification stages, for producing a pure $MgCl_2$ solution, suitable for the production of Mg metal by subsequent electrolysis, from seawater or $MgCl_2$ brines or from byproduct $MgCl_2$ solutions and offers significant advantages both in terms of ease of operation and economy.

The invention is further illustrated by the following examples in which a magnesite ore, containing approximately 50–55% magnesite, 20–30% talc, 15–20% quartz and 5–10% iron oxides as well as significant nickel (0.1–0.2%), chromium (0.01–0.1%) and manganese (0.01–0.1%) content, was treated.

EXAMPLE 1

Magnesite ore, ground to 80% minus 6 mesh and calcined at 700° C. for 2 hours, was reacted with concentrated hydrochloric acid (35.8% HCl) in a stirred vessel with the addition of 0.02% of a surfactant (Monawet MM-80). The addition rate of calcined ore was adjusted to prevent boiling of the solution, and was added over a period of 4 hours until the pH had reached 6.7. Slurry samples were taken after 20 and 270 minutes, filtered and analyzed for critical impurities. The results are shown in Table 1.

tion for the 800° C. calcine over that produced at 700° C. Similar results were obtained for a calcine produced

TABLE I

TEST RESULTS

| TEST | TIME min | pH | SOLIDS ANALYSIS, % | | | | | | | LIQUOR ANALYSIS, g/L (mg/L) | | | | | | | Mg. Extraction % |
|---|---|---|---|---|---|---|---|---|---|---|---|---|---|---|---|---|---|
| | | | Mg | Fe | Mn | Cr | Ni | Ca | $SiO_2$ | Mg | Fe | Mn | Cr | Ni | Ca | $SiO_2$ | |
| 1. Calcined ore | Feed | | 21.7 | 2.05 | 0.064 | 0.045 | 0.11 | 0.020 | 54.3 | | | | | | | | |
| at 700° C. + | 20 | 1.25 | 14.4 | 2.31 | 0.020 | 0.040 | 0.13 | 0.008 | | 97.7 | 7.2 | 0.36 | 0.19 | 0.33 | 0.12 | | 70.8 |
| surfactant | 270 | 6.70 | 14.1 | 2.86 | 0.084 | 0.051 | 0.15 | 0.005 | 46.8 | 85.0 | (1.4) | (2.5) | (1.5) | (1.0) | 0.12 | (30) | 55.5 |
| 2. Calcined ore | Feed | | 27.1 | 3.01 | 0.057 | 0.053 | 0.20 | 0.36 | 42.2 | | | | | | | | |
| at 700° C. + | 145 | 3.0 | 14.4 | 4.04 | 0.023 | 0.062 | 0.21 | 0.015 | | 99.6 | (2.6) | 0.21 | (1.6) | 0.19 | 2.34 | | 62.5 |
| surfactant | 240 | 5.25 | 14.2 | 4.01 | 0.041 | 0.063 | 0.26 | 0.015 | | 93.4 | (3.2) | 0.12 | (1.3) | (21) | 2.22 | | 61.4 |
| | 435 | 6.45 | 15.6 | 3.95 | 0.063 | 0.062 | 0.26 | 0.016 | | 91.2 | (3.0) | (46) | (1.7) | (1.1) | 2.23 | | 58.3 |
| | 30h | 6.75 | 15.0 | 4.03 | 0.070 | 0.062 | 0.27 | 0.019 | 50.1 | 92.9 | (2.1) | (21) | (1.4) | (1.1) | 2.20 | (4) | 59.5 |
| 3. Calcined | Feed | | 34.7 | 4.41 | 0.13 | 0.041 | 0.13 | 0.51 | 25.8 | | | | | | | | |
| concentrate | 146 | 4.0 | 16.8 | 6.78 | 0.14 | 0.056 | 0.20 | 0.035 | | 112 | (3.3) | 0.16 | (1.6) | (47) | 2.36 | | 73.1 |
| at 700° C. + | 156 | 5.40 | 15.3 | 7.01 | 0.16 | 0.058 | 0.21 | 0.039 | | 105 | (2.7) | 0.12 | (2.0) | (5.7) | 2.33 | | 73.3 |
| surfactant | 270 | 6.54 | 14.8 | 5.77 | 0.15 | 0.048 | 0.17 | 0.038 | 43.8 | 101 | (2.1) | (49) | (1.7) | (2.0) | 2.33 | (4) | 75.7 |
| 4. Calcined | Feed | | 35.1 | 5.16 | 0.14 | 0.032 | 0.18 | 0.51 | | | | | | | | | |
| concentrate | 75 | 3.08 | 17.4 | 8.64 | 0.14 | 0.047 | 0.25 | 0.12 | | 114 | (1.8) | 0.32 | (0.9) | 0.16 | 3.10 | | 73.9 |
| at 700° C. | 135 | 6.00 | 24.3 | 6.54 | 0.18 | 0.036 | 0.23 | 0.15 | | 114 | (11) | (24) | (1.0) | (9.8) | 4.64 | (4) | 47.5 |
| no surfactant | 270 | 6.43 | 23.6 | 5.17 | 0.13 | 0.034 | 0.18 | 0.22 | | 103 | (6.4) | (4.1) | (0.9) | (8.3) | 4.58 | (4) | 19.6 |
| 5. Calcined | Feed | | 36.5 | 5.29 | 0.15 | 0.029 | 0.19 | 0.81 | | | | | | | | | |
| concentrate | 130 | 3.05 | 17.6 | 9.43 | 0.11 | 0.054 | 0.19 | 0.088 | | 101 | (1.7) | 0.33 | (0.7) | 0.28 | 2.66 | | 76.7 |
| at 800° C. + | 160 | 6.02 | 17.4 | 9.82 | 0.18 | 0.058 | 0.32 | 0.13 | | 102 | (15) | (88) | (0.8) | (16) | 2.80 | | 76.4 |
| surfactant | 270 | 6.75 | 18.6 | 8.87 | 0.23 | 0.055 | 0.30 | 0.089 | | 93.2 | (9.5) | (76) | (0.9) | (8.8) | 2.86 | (4) | 72.3 |

Initially, most of the heavy metal impurities are dissolved into solution but they are virtually completely precipitated at pH 6.7 to give a pure $MgCl_2$ solution suitable for electrolytic Mg production. Mg recovery was 56%, accounting for substantially 100% of the Mg contained as magnesite in the feed ore. The concentrations of other critical impurities, including B (<0.1 mg/L), $SO_4$ (<20 mg/L), Br (<0.01 mg/L), P (<0.01 mg/L), and $SiO_2$ (30 mg/L), were also well below acceptable levels for Mg production.

EXAMPLE 2

As example 1, but with a different ore sample and the slurry was allowed to react for 24 hours. This shows that at a pH of 6.5, Ni was precipitated to a level low enough (1 mg/L) not to be of any problem during electrolysis (Table 1). In this test, Mg recovery was 63%, again accounting for 100% of the Mg in the magnesite.

EXAMPLE 3

In this example, the magnesite ore was ground to minus 70 mesh and subjected to flotation to remove part of the talc and quartz and produce a crude magnesite concentrate. The resulting concentrate was calcined for 2 hours at 700° C. and treated in the same manner as described in example 1. The results are shown in Table 1. Total Mg recovery was 76%. The results show that a $MgCl_2$ solution of purity acceptable for subsequent molten salt Mg electrolysis is obtained after about 4–5 hours under these conditions. In this test, Ni was reduced to 5.7 mg/L at a pH of 5.40.

EXAMPLE 4

Crude magnesite concentrate, minus 70 plus 150 mesh, was calcined for two hours at 700° C., and the resulting calcine leached as in Example 1, except that no surfactant was added. The resulting slurry, particularly at pH>6, was very viscous and extremely slow to filter. Appreciably more calcine was required to raise the pH towards 6.5, with a resultant decrease in magnesium recovery to 20%. This test clearly demonstrates the advantages of the surface active wetting agent.

EXAMPLE 5

As for example 3, except the calcination temperature was 800° C. There was essentially no difference in reaction for the 800° C. calcine over that produced at 700° C. Similar results were obtained for a calcine produced at 900° C.

Although the invention has been disclosed with reference to a proposed flowsheet and to specific examples, it is to be understood that it is not limited to the flowsheet or the examples but by the following claims.

We claim:

1. Process for producing a substantially pure, concentrated $MgCl_2$ solution suitable for subsequent molten salt electrolysis to magnesium metal from an impure magnesite ore or concentrate comprising:
   (a) calcining a magnesite ore or concentrate at a temperature greater than 600° C. to decompose most of the magnesite and form a reactive magnesia;
   (b) dissolving said reactive magnesia with either concentrated hydrochloric acid or hydrogen chloride gas with the addition of a surface active wetting agent to produce an impure concentrated $MgCl_2$ solution; and
   (c) reacting said impure concentrated $MgCl_2$ solution with a minimum of excess magnesia to increase the pH of the solution to at least 5.5 to precipitate undesirable impurities from solution and produce a substantially pure $MgCl_2$ solution.

2. Process as defined in claim 1, wherein the magnesite ore is calcined at a temperature between 700° and 900° C.

3. Process as defined in claim 1, wherein sufficient excess magnesia is added to raise the pH of the solution to 6.5–6.8.

4. Process as defined in claim 1, wherein the impurities precipitated from solution by the addition of excess magnesia as precipitating agent are iron, nickel, chromium, manganese, or other heavy and base metals.

5. Process as defined in claim 1, further comprising the step of drying the substantially pure concentrated $MgCl_2$ solution to anhydrous $MgCl_2$ or hydrated $MgCl_2.2H_2O$ for magnesium metal production by any of the established electrolytic processes.

6. Process as defined in claim 5, further comprising the steps of performing electrolysis of said anhydrous $MgCl_2$ or hydrated $MgCl_2 2H_2O$ to produce magnesium metal and chlorine gas, and regenerating hydrochloric acid or hydrogen chloride gas from said chlorine gas using $CH_4$.

* * * * *